(12) United States Patent
Klimpel

(10) Patent No.: US 8,360,358 B2
(45) Date of Patent: Jan. 29, 2013

(54) RAM AIR DUCT FLAP ARRANGEMENT AND RAM AIR DUCT

(75) Inventor: Frank Klimpel, Naherfurth in Kayhude (DE)

(73) Assignee: Airbus Operations GmbH, Hamburg (DE)

( * ) Notice: Subject to any disclaimer, the term of this patent is extended or adjusted under 35 U.S.C. 154(b) by 305 days.

(21) Appl. No.: 12/894,488

(22) Filed: Sep. 30, 2010

(65) Prior Publication Data

US 2011/0073716 A1 Mar. 31, 2011

Related U.S. Application Data

(60) Provisional application No. 61/247,050, filed on Sep. 30, 2009.

(30) Foreign Application Priority Data

Sep. 30, 2009 (DE) .......................... 10 2009 043 797

(51) Int. Cl.
*B64D 33/02* (2006.01)
(52) U.S. Cl. ......................... 244/53 B; 244/53 R; 60/262
(58) Field of Classification Search ................. 244/53 B, 244/53 R, 1 R, 59, 58, 57; 60/226.1, 230, 60/262; 137/15.1
See application file for complete search history.

(56) References Cited

U.S. PATENT DOCUMENTS

| | | | | |
|---|---|---|---|---|
| 2,773,440 A | * | 12/1956 | Arthur | 454/72 |
| 5,435,127 A | * | 7/1995 | Luffy et al. | 60/204 |
| 6,271,769 B1 | * | 8/2001 | Frantz | 340/963 |
| 7,543,777 B2 | * | 6/2009 | Schmidt et al. | 244/53 B |
| 7,849,702 B2 | * | 12/2010 | Parikh | 62/241 |
| 2007/0120009 A1 | * | 5/2007 | Kelnhofer | 244/53 R |
| 2010/0210201 A1 | * | 8/2010 | Dreisilker et al. | 454/74 |
| 2011/0073716 A1 | * | 3/2011 | Klimpel | 244/53 B |

FOREIGN PATENT DOCUMENTS

| | | |
|---|---|---|
| DE | 10361644 | 8/2005 |
| DE | 102007023685 | 10/2008 |
| DE | 102007045755 | 4/2009 |
| WO | 2009064288 | 5/2009 |

* cited by examiner

*Primary Examiner* — Christopher P Ellis
*Assistant Examiner* — Medhat Badawi
(74) *Attorney, Agent, or Firm* — Wood, Herron & Evans, LLP

(57) ABSTRACT

A ram air duct flap arrangement (22) comprises at least one ram air duct flap (24, 26) which is designed to close, in a closed position, a ram air inlet (14) or a ram air outlet (18) of a ram air duct (10) and, at least partly open, in an open position, the ram air inlet (14) or the ram air outlet (18) of the ram air duct (10). Furthermore, the ram air duct flap arrangement (22) comprises an actuator (32) for actuating the ram air duct flap (24, 26) between its closed position and its open position. A pressure control device (42) is designed to control a pressure ($p_i$), which, when the ram air duct flap arrangement (22) is mounted in an aircraft, acts on an inner surface (44) of the ram air duct flap (24, 26) facing an interior of the aircraft, in such a way that it corresponds substantially to a pressure ($p_a$) which, when the ram air duct flap arrangement (22) is mounted in an aircraft, acts on an outer surface (38) of the ram air duct flap (24, 26) facing the external environment.

9 Claims, 2 Drawing Sheets

RAM AIR DUCT FLAP ARRANGEMENT AND RAM AIR DUCT

Figure 1:
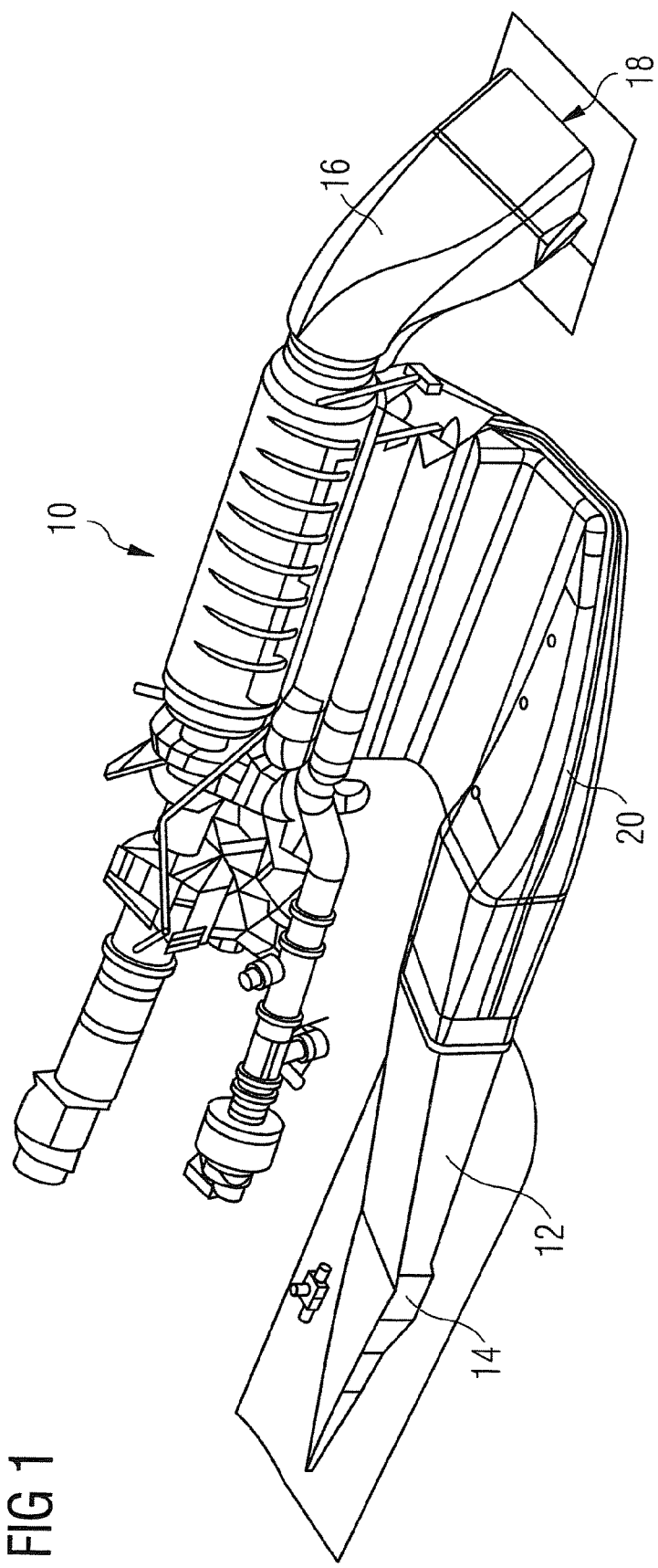

This application claims priority to U.S. Provisional Patent Application No. 61/247,050, filed on Sep. 30, 2009; and/or German Application No. 10 2009 043 797.5 filed on Sep. 30, 2009.

The invention relates to a ram air duct flap arrangement intended for use an aircraft. Furthermore, the invention relates to a ram air duct equipped with such a ram air duct flap arrangement.

A modern aircraft is equipped with a series of systems which have to be supplied with ambient air when the aircraft is flying and/or running on the ground. These systems to be supplied with ambient air include, for example, an air conditioning system serving for air conditioning of the aircraft cabin and for cooling heat-generating equipment on board the aircraft, as well as other cooling and ventilating systems which may, for example, be provided to supply ambient air to electronic components of the aircraft for cooling and/or ventilating purposes. The supply of ambient air to the systems on board the aircraft which are to be supplied with ambient air is usually carried out with the aid of a ram air duct, described, for example, in DE 10 2007 023 685 B3.

A conventional ram air duct suitable, for example, for use in an aircraft air conditioning system comprises a ram air inlet duct which can be provided, for example, with an NACA (National Advisory Committee for Aeronautics) ram air inlet arranged in the region of the aircraft skin. A flow cross-section of the ram air inlet and/or of a section of the ram air inlet duct arranged downstream of the ram air inlet is controlled by appropriate positioning of one or more ram air inlet duct flap(s). For actuation of the ram air inlet duct flap(s), (an) appropriately suitable actuator(s) can be used. Downstream of the ram air inlet, a diffuser is formed in the ram air inlet duct. In the diffuser, the dynamic pressure of the ambient air flow led into the ram air inlet duct via the ram air inlet is partly converted into static pressure owing to the slowing-down of the flow in the diffuser. As a result, relative to the ambient pressure, a static positive pressure, also called ram pressure, is produced in the region of an inlet of an aircraft component to be supplied with ambient air, for example of a heat exchanger arranged in the ram air duct.

The ram air duct furthermore comprises a ram air outlet duct which serves to guide ambient air, led into the interior of the aircraft via the ram air inlet duct, back into the aircraft environment again after its utilisation on board the aircraft, for example after flowing through a heat exchanger arranged in the ram air duct. A flow cross-section of a ram air outlet, arranged in the region of the aircraft skin, of the ram air outlet duct is controlled by appropriate positioning of one or more ram air outlet duct flap(s). For actuation of the ram air outlet duct flap(s), use may be made, in a manner similar to the actuation of the ram air inlet duct flap(s), of an appropriately suitable actuator.

When the aircraft is running on the ground, the ambient air is usually conveyed through the ram air duct by means of a suitable conveying device. For example, a fan of the air cycle machine (ACM) can be used to convey ambient air through the ram air duct when the aircraft is running on the ground. When the aircraft is flying, in contrast, ambient air is already flowing through the ram air duct owing to the pressure conditions in the region of the ram air inlet and the ram air outlet. The ram air inlet is preferably arranged in a region of the aircraft skin on which, when the aircraft is flying, a higher pressure acts than on a region of the aircraft skin in which the ram air outlet is positioned.

Furthermore, the pressure conditions in the region of the ram air inlet and the ram air outlet are influenced by the position of the ram air inlet duct flap(s) and the ram air outlet duct flap(s). For example, relative to the ambient pressure, a negative pressure is produced in the ram air outlet duct when a ram air outlet duct flap, in a position in which it frees a desired flow cross-section of the ram air outlet, projects into the ambient air flow flowing round the aircraft skin when the aircraft is flying. Furthermore, a widely opened ram air outlet duct flap frees a large flow cross-section of the ram air outlet, with the result that a resistance of the ram air outlet duct opposing the flow of ambient air through the ram air duct is minimised. The negative pressure which builds up in the ram air outlet duct when the ram air outlet duct flap is open thus brings about, when the aircraft is flying, the production of a differential pressure between the ram air inlet and the ram air outlet and consequently the conveyance of ambient air through the ram air duct and, for example, a heat exchanger arranged in the ram air duct.

At present, the ambient air mass flow through a ram air duct is controlled primarily by appropriate positioning of the ram air outlet duct flap(s) which follows, with a time delay, appropriate positioning of the ram air inlet duct flap(s). In the case of such a control of the positions of the ram air outlet duct flap(s) and the ram air inlet duct flap(s), the build-up of a high differential pressure across the ram air outlet duct flap(s) and the ram air inlet duct flap(s), i.e. the build-up of a high differential pressure between an outer surface of the flaps facing the external environment and an inner surface of the flaps facing an interior of the aircraft is limited to a tolerable degree. Consequently, the forces acting on the actuators for actuating the flaps also lie in an acceptable range. For example, the force acting on an actuator for actuating a ram air inlet duct flap at a flying altitude of 30,000 feet (9144 m) and a flying speed of 0.8 Mach is about 1500 N.

The opening of a ram air outlet duct flap, as well as the opening of a ram air inlet duct flap, increases the drag and thus the fuel consumption of the aircraft. However, recent aerodynamic studies have shown that an open ram air outlet duct flap produces higher additional drag than an open ram air inlet duct flap. Efforts are therefore being made, in the case of the control of an ambient air mass flow through a ram air duct, to favour the opening of a ram air inlet duct flap over the opening of a ram air outlet duct flap, i.e. the differential pressure between the ram air inlet and the ram air outlet which is required to convey the ambient air mass flow through the ram air duct is primarily produced by opening the ram air inlet duct flap(s), while the ram air outlet duct flap(s) remains (remain) as far as possible closed.

However, such a control of the positions of the ram air inlet duct flap(s) and the ram air outlet duct flap(s) results in a very high differential pressure building up between an outer surface of a ram air inlet duct flap facing the external environment and an inner surface of the ram air inlet duct flap facing an interior of the aircraft, which is determined by the difference between the pressure $p_a$ acting on the outer surface of the ram air inlet duct flap and the pressure $p_i$ acting on the inner surface of the ram air inlet duct flap. For the pressure $p_a$ acting on the outer surface of the ram air inlet duct flap it holds that $$p_a = f p_{dyn},$$

where f is a constant factor and $p_{dyn}$ is the absolute ram pressure in the region of the ram air inlet duct flap. The pressure $p_i$ acting on the inner surface of the ram air inlet duct flap, in contrast, corresponds to the pressure prevailing in the unpressurised belly fairing of the aircraft, i.e. the static ambient pressure.

Owing to the high differential pressure acting on the ram air inlet duct flap(s), the actuator(s) for actuating the ram air inlet duct flap(s) is (are) subjected to very high forces of up to 10,000 N. In the event of a fault in which the ram air outlet duct flap(s) remains (remain) fully closed when the ram air inlet duct flap(s) is (are) open, the actuator(s) assigned to the ram air inlet duct flap(s) may even be loaded by forces of up to 12,500 N. In order to be able to withstand these loads, the actuator(s) must be constructed with appropriate robustness, for example by suitable material choice and suitable dimensioning. However, this results in an undesirable increase in the weight of the actuator(s). Moreover, the actuator(s) must be very powerful, with the result that the actuator(s) have a high energy demand, possibly even necessitating the laying of stronger lines. Finally, the high mechanical loading of the actuator(s) even with appropriate design of the actuator(s) leads to high wear in particular of moving mechanical actuator components and consequently shorter service intervals and an increased probability of failure.

The object on which the invention is based is to provide a ram air duct flap arrangement which is intended for use in an aircraft and which makes it possible to minimise forces acting, when the aircraft is flying, on an actuator for actuating a ram air duct flap. Furthermore, the object on which the invention is based is to specify a ram air duct equipped with such a ram air duct flap arrangement.

This object is achieved by a ram air duct flap arrangement having the features of claim 1 and by a ram air duct having the features of claim 9.

The ram air duct flap arrangement according to the invention comprises at least one ram air duct flap which is designed to close, in a closed position, a ram air inlet or a ram air outlet of a ram air duct. In contrast, the ram air duct flap at least partly opens, in an open position, the ram air inlet or the ram air outlet of the ram air duct. For example, the ram air duct flap can be designed to be adjusted stepwise or continuously variably between its closed position and its open position. Preferably, the ram air duct flap of the ram air duct flap arrangement according to the invention is configured so that, when the ram air duct flap arrangement is mounted in an aircraft, the ram air duct flap in its open position does not project into an ambient air flow flowing round a skin of the aircraft in flight. As a result, the additional drag produced by the opening of the ram air duct flap and thus the fuel consumption of the aircraft can be minimised. Furthermore, the ram air duct flap arrangement according to the invention comprises at least one actuator for actuating the ram air duct flap between its closed position and its open position. The actuator may be any desired suitable actuator.

Finally, the ram air duct flap arrangement according to the invention comprises a pressure control device which is designed to control a pressure, which, when the ram air duct flap arrangement is mounted in an aircraft, acts on an inner surface of the ram air duct flap facing an interior of the aircraft, in such a way that it corresponds substantially to a pressure which, when the ram air duct flap arrangement is mounted in an aircraft, acts on an outer surface of the ram air duct flap facing the external environment. In other words, the pressure control device is designed to ensure that a differential pressure across the ram air duct flap is substantially equal to zero.

In this way, the mechanical loading of the ram air duct flap and of the actuator actuating the ram air duct flap can be minimised. Consequently, the ram air duct flap, as well as the actuator, can be constructed less robustly and thus lighter in weight. Furthermore, the lower mechanical loading of the ram air duct flap and of the actuator results in moving mechanical components, in particular, being subjected to lower wear. As a result, the service intervals for the ram air duct flap and the actuator can be increased and the probability of failure of these components reduced. Finally, the lower forces acting on the ram air duct flap and the actuator enable a less powerful design of the actuator. As a result, the energy demand of the actuator can be reduced.

Preferably, the pressure control device comprises at least one pressure equalising opening which is designed to provide for an equalisation between the pressure which, when the ram air duct flap arrangement is mounted in an aircraft, acts on the inner surface of the ram air duct flap facing the interior of the aircraft and the pressure which, when the ram air duct flap arrangement is mounted in an aircraft, acts on an outer surface of the ram air duct flap facing the external environment. The dimensioning of the pressure equalising opening is preferably carried out in dependence on the dimensioning and design of the ram air duct flap and in dependence on the pressure acting on the outer surface of the ram air duct flap facing the external environment when the ram air duct flap arrangement is in operation. As a result of a pressure equalising opening, it is possible to ensure in a simple and uncomplicated manner a pressure equalisation between the pressure acting on the inner surface of the ram air duct flap facing the interior of the aircraft and the pressure acting on the outer surface of the ram air duct flap facing the external environment.

The pressure equalising opening can be arranged in the region of a flap surface of the ram air duct flap. Alternatively or additionally to this, however, it is also conceivable to arrange the pressure equalising opening in the region of a hinge for the hinged connection of the ram air duct flap to a component adjacent to the ram air duct flap, i.e. in the region of a hinge point at which the ram air duct flap is hingedly connected to a component adjacent to the ram air duct flap. The component adjacent to the ram air duct flap can be a region of an aircraft skin adjoining the ram air inlet or the ram air outlet, a wall section of the ram air duct or a further ram air duct flap adjacent to the ram air duct flap. The pressure control device of the ram air duct flap arrangement according to the invention may, if required, also comprise a plurality of pressure equalising openings, which may be dimensioned and positioned as required.

The pressure control device of the ram air duct flap arrangement according to the invention can furthermore comprise a sealing device which is designed to seal a region of the ram air duct, which, when the ram air duct flap arrangement is mounted in an aircraft, adjoins the inner surface of the ram air duct flap facing the interior of the aircraft, with respect to a region of the aircraft adjacent to this ram air duct region. The sealing device prevents the pressure which prevails in the region of the aircraft adjacent to the ram air duct region adjoining the inner surface of the ram air duct flap from acting on the inner surface of the ram air duct flap. As a result, the build-up of a differential pressure across the ram air duct flap is prevented. For example, the sealing device can be designed to seal the region of the ram air duct, which, when the ram air duct flap arrangement is in the state where it is mounted in an aircraft, adjoins the inner surface of the ram air duct flap facing the interior of the aircraft, with respect to an unpressurised belly fairing of the aircraft. In the case of such an arrangement, the sealing device prevents the pressure in the belly fairing which corresponds to the static ambient pressure from acting on the inner surface of the ram air duct flap.

The actuator for actuating the ram air duct flap can be arranged, when the ram air duct flap arrangement is mounted in an aircraft, at least partly in the region of the aircraft which is sealed by means of the sealing device of the pressure control device with respect to the region of the ram air duct which, when the ram air duct flap arrangement is mounted in an aircraft, adjoins the inner surface of the ram air duct flap facing the interior of the aircraft. For example, a drive and also components required for controlling the actuator can be arranged in the aircraft region, e.g. the belly fairing, which is adjacent to the region of the ram air duct adjoining the inner surface of the ram air duct flap. An actuating element of the actuator can then extend through the ram air duct region adjoining the inner surface of the ram air duct flap and establish a connection between the actuator drive and the ram air duct flap.

Preferably, an actuating element, connected to the ram air duct flap, of the actuator penetrates in a sealing manner through the sealing device of the pressure control device. In other words, the actuating element of the actuator is preferably passed through the sealing device of the pressure control device in such a way that the sealing function of the sealing device is not impaired.

A ram air duct according to the invention comprises a ram air duct flap arrangement described above, in which the ram air duct flap arrangement described above is usable both as a ram air inlet duct flap arrangement and as a ram air outlet duct flap arrangement. In a preferred embodiment of the ram air duct according to the invention, however, at least one ram air inlet duct flap arrangement is embodied in the form of a ram air duct flap arrangement described above.

Figure 2:
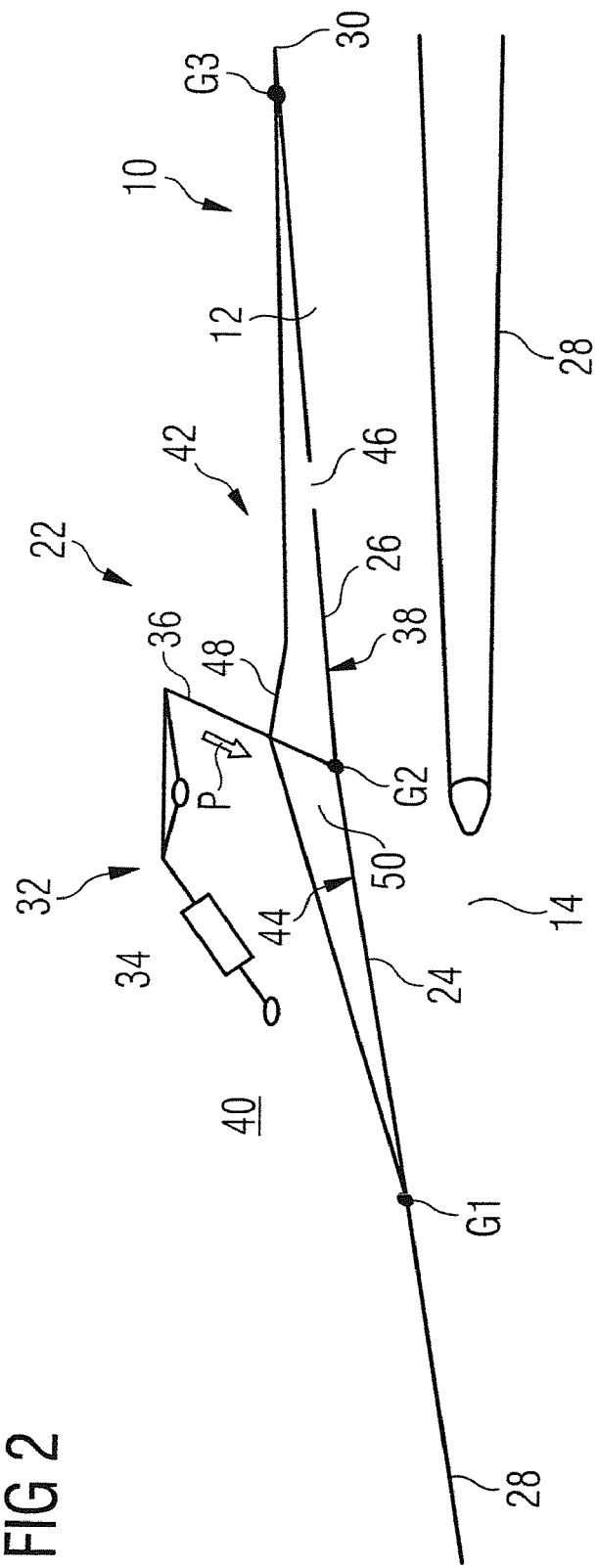

A preferred embodiment of the invention will now be explained in more detail with the aid of the appended schematic drawings, of which FIG. 1 shows a ram air duct suitable for use in an aircraft, and FIG. 2 shows a cross-sectional illustration of a ram air duct flap arrangement suitable for use in a ram air duct according to FIG. 1.

Illustrated in FIG. 1 is a ram air duct 10, denoted as a whole by 10, intended for use in an aircraft. The ram air duct 10 comprises a ram air inlet duct 12 having a ram air inlet 14 and a ram air outlet duct 16 having a ram air outlet 18. A diffuser 20, arranged downstream of the ram air inlet duct 12 in relation to the direction of the air flow through the ram air duct 10, distributes the ram air, serving as cooling air, over the surface of a cooler (not illustrated) of an air conditioning system.

FIG. 2 shows a cross-sectional illustration of a ram air duct flap arrangement 22 provided in the region of the ram air inlet 14 of the ram air duct 10 illustrated in FIG. 1. In the region of the ram air outlet 18, the ram air duct 10 can likewise be equipped with a ram air duct flap arrangement 22 according to FIG. 2, but also with a conventional ram air duct flap arrangement.

The ram air duct flap arrangement 22 comprises a first and a second ram air inlet duct flap 24, 26. The ram air inlet duct flaps 24, 26 are designed to close, in a closed position, the ram air inlet 14 of the ram air duct 10. The first ram air inlet duct flap 24 is hingedly connected at a first hinge point $G_1$ to a section of an aircraft skin 28 adjacent to the ram air inlet 14. In contrast, the first ram air inlet duct flap 24 is hinged to the second ram air inlet duct flap 26 at a second hinge point $G_2$. Finally, the second ram air inlet duct flap 26 is hingedly connected to a wall 30 of the ram air duct 10 at a third hinge point $G_3$. In their open position shown in FIG. 2, the ram air inlet duct flaps 24, 26 free the ram air inlet, the freed flow cross-section of the ram air inlet being determined by the angle of inclination of the ram air inlet duct flaps 24, 26 relative to the section of the aircraft skin 28 adjoining the ram air inlet 14.

The ram air duct flap arrangement 22 furthermore comprises an actuator 32 for actuating the ram air inlet duct flaps 24, 26. In particular, the actuator 32 is designed to move the ram air inlet duct flaps 24, 26 continuously variably between their closed position and their open position. The actuator 32 comprises a drive unit 34 and an actuating element 36. A first end of the actuating element 36 is connected to the drive unit 34 of the actuator 36. A second end of the actuating element 36 is, in contrast, connected to the ram air inlet duct flaps 24, 26 at the second hinge point $G_2$. By applying a force in the direction of the arrow P in FIG. 2 via the actuating element 36, the actuator 36 can thus ensure a movement of the ram air inlet duct flaps 24, 26 into a position in which the ram air inlet duct flaps 24, 26 close the ram air inlet 14.

When the aircraft is flying, a pressure $p_a$ acts on an outer surface 38, facing the external environment of the aircraft, of the ram air inlet duct flaps 24, 26 situated in their open position shown in FIG. 2, for which pressure it holds that $$p_a = f p_{dyn},$$

where f is a constant factor and $p_{dyn}$ is the absolute ram pressure in the region of the ram air inlet duct flaps 24, 26. In contrast, in an aircraft region 40 adjoining the ram air duct 10, which region may be formed for example by a region of the unpressurised belly fairing of the aircraft, a pressure corresponding to the static ambient pressure prevails.

In order to prevent a differential pressure from building up across the ram air inlet duct flaps 24, 26, which pressure is determined by the difference between the pressure $p_a$ acting on the outer surface 38 of the ram air inlet duct flaps 24, 26 and the pressure in the belly fairing corresponding to the static ambient pressure, the ram air duct flap arrangement 22 furthermore comprises a pressure control device 42. The pressure control device 42 is designed to control a pressure $p_i$, which acts on an inner surface 44 of the ram air inlet duct flaps 24, 26 facing an interior of the aircraft, in such a way that it corresponds substantially to the pressure $p_a$ which acts on the outer surface 38 of the ram air inlet duct flaps 24, 26 facing the external environment of the aircraft.

For this purpose, the pressure control device 42 comprises a pressure equalising opening 46 which, in the embodiment of a ram air duct flap arrangement 22 shown in FIG. 2, is arranged the region of a flap surface of the second ram air inlet duct flap 26. Alternatively to this, it is also conceivable to arrange the pressure equalising opening 46 in the region of one of the hinge points $G_1$, $G_2$ or $G_3$. Furthermore, a plurality of pressure equalising openings 42 may also be provided, if required. All that is essential is that the pressure equalising opening(s) 46 enables (enable) an equalisation between the pressure $p_a$ acting on the outer surface 38 of the ram air inlet duct flaps 24, 26 and the pressure $p_i$ acting on the inner surface 44 of the ram air inlet duct flaps 24, 26. The flow cross-section of the pressure equalising opening(s) 46 is therefore adapted to the pressure $p_a$ acting on the outer surface 38 of the ram air inlet duct flaps 24, 26 when the ram air duct flap arrangement 22 is in operation.

Finally, the pressure control device 42 comprises a sealing device 48 which serves to seal a region 50 of the ram air duct 10, which, when the ram air duct flap arrangement 22 is in the state where it is mounted in an aircraft, adjoins the inner surface 44 of the ram air inlet duct flaps 24, 26 facing the interior of the aircraft, with respect to the region 40 of the aircraft adjacent to this ram air duct region 50. In other words, in the embodiment of a ram air duct flap arrangement 22 shown in FIG. 2, the sealing device 48 seals the ram air duct region 50 adjoining the inner surface 44 of the ram air inlet duct flaps 24, 26 with respect to the unpressurised belly fairing of the aircraft. The pressure prevailing in the belly fairing corresponding to the static ambient pressure is thereby reliably prevented from acting on the inner surface 44 of the ram air inlet duct flaps 24, 26. The sealing device 48 may be embodied, for example, in the form of a sealing element composed of an elastic material.

As can be seen in FIG. 2, the drive 34 and also a section, facing the drive 34, of the actuating element 36 of the actuator 32 are arranged in the unpressurised belly fairing, i.e. the region 40 of the aircraft which is adjacent to the ram air duct region 50 adjoining the inner surface 44 of the ram air inlet duct flaps 24, 26. The actuating element 36 of the actuator 32 therefore penetrates through the sealing device 48 of the pressure control device 42 in a sealing manner, i.e. the sealing action of the sealing device 48 is not impaired by the actuator actuating element 36 passing through the sealing device 48 of the pressure control device 42.

The invention claimed is:

1. Ram air duct flap arrangement having:
   at least one ram air duct flap which is designed to close, in a closed position, a ram air inlet or a ram air outlet of a ram air duct and, at least partly open, in an open position, the ram air inlet or the ram air outlet of the ram air duct,
   at least one actuator for actuating the ram air duct flap between its closed position and its open position, and
   a pressure control device which is designed to control a pressure, which, when the ram air duct flap arrangement is mounted in an aircraft, acts on an inner surface of the ram air duct flap facing an interior of the aircraft, in such a way that it corresponds substantially to a pressure which, when the ram air duct flap arrangement is mounted in an aircraft, acts on an outer surface of the ram air duct flap facing the external environment.

2. Ram air duct flap arrangement according to claim 1, wherein the pressure control device comprises at least one pressure equalising opening which is designed to provide for an equalisation between the pressure which, when the ram air duct flap arrangement is mounted in an aircraft, acts on the inner surface of the ram air duct flap facing the interior of the aircraft and the pressure which, when the ram air duct flap arrangement is mounted in an aircraft, acts on an outer surface of the ram air duct flap facing the external environment.

3. Ram air duct flap arrangement according to claim 2, wherein the pressure equalising opening is arranged in the region of a flap surface of the ram air duct flap.

4. Ram air duct flap arrangement according to claim 2, wherein the pressure equalising opening is arranged in the region of a hinge point at which the ram air duct flap is hingedly connected to a component adjacent to the ram air duct flap.

5. Ram air duct flap arrangement according to claim 1, wherein the pressure control device comprises a sealing device which is designed to seal a region of the ram air duct, which, when the ram air duct flap arrangement is mounted in an aircraft, adjoins the inner surface of the ram air duct flap facing the interior of the aircraft, with respect to a region of the aircraft adjacent to this region of the ram air duct.

6. Ram air duct flap arrangement according to claim 5, wherein the sealing device is designed to seal the region of the ram air duct, which, when the ram air duct flap arrangement is mounted in an aircraft, adjoins the inner surface of the ram air duct flap facing the interior of the aircraft, with respect to an unpressurised belly fairing of the aircraft.

7. Ram air duct flap arrangement according to claim 5, wherein the actuator for actuating the ram air duct flap is arranged, when the ram air duct flap arrangement is mounted in an aircraft, at least partly in the region of the aircraft which is sealed by means of the sealing device of the pressure control device with respect to the region of the ram air duct which, when the ram air duct flap arrangement is mounted in an aircraft, adjoins the inner surface of the ram air duct flap facing the interior of the aircraft.

8. Ram air duct flap arrangement according to claim 7, wherein an actuating element, connected to the ram air duct flap, of the actuator penetrates sealingly through the sealing device of the pressure control device.

9. Ram air duct, comprising a ram air duct flap arrangement according to claim 1.

* * * * *